United States Patent [19]

Anders

[11] 4,235,581
[45] Nov. 25, 1980

[54] SCREW EXTRUSION PRESS HAVING TEMPERATURE-CONTROL MEANS

[75] Inventor: Dietmar Anders, Hanover, Fed. Rep. of Germany

[73] Assignee: Hermann Berstorff Maschinenbau GmbH, Hanover, Fed. Rep. of Germany

[21] Appl. No.: 22,249

[22] Filed: Mar. 20, 1979

[30] Foreign Application Priority Data

Mar. 20, 1978 [DE] Fed. Rep. of Germany ....... 2812065

[51] Int. Cl.³ ................................................ B29F 3/08
[52] U.S. Cl. ................................ 425/378 R; 165/71; 366/79; 366/144
[58] Field of Search ............. 425/461, 378 R; 366/79, 366/144; 165/71

[56] References Cited

U.S. PATENT DOCUMENTS

| 2,796,632 | 6/1957 | Willert | 425/378 |
|---|---|---|---|
| 2,958,099 | 11/1960 | Chisholm et al. | 425/378 |
| 3,030,193 | 4/1962 | Marullo et al. | 366/144 |
| 3,900,188 | 8/1975 | Seufert | 366/79 |

FOREIGN PATENT DOCUMENTS 867613 1/1953 Fed. Rep. of Germany .

Primary Examiner—Jeffery R. Thurlow
Attorney, Agent, or Firm—Schwartz, Jeffery, Schwaab, Mack, Blumenthal & Koch

[57] ABSTRACT

A screw extrusion press having longitudinally extending bores in the wall thereof for heating or cooling the cylinder wall by passage therethrough of a temperature control medium. The passages are divided into sets of three adjacent passages with each set of three passages so connected to one another by annular passages which are divided off into respective portions for each set that medium supplied to an inlet manifold provided in a connecting flange at one end of the cylinder passes through a radial bore into a first passage of each set, flows along that passage to the other end of the cylinder, passes into a respective portion of the annular passage, passes into the second passage of each set, passes back along the cylinder into a respective portion of the annular passage and passes into the third passage of the set to pass along the cylinder, through a radial bore into an outlet manifold in a connecting flange at the other end of the cylinder and thence to an outlet connection.

3 Claims, 3 Drawing Figures

SCREW EXTRUSION PRESS HAVING TEMPERATURE-CONTROL MEANS

The invention relates to a screw extrusion press having temperature-control means, for processing thermoplastic plastics materials and rubber, and having a cylinder which encloses a screw and in which peripheral bores are provided in the axial direction, the bores being connected to supply and discharge conduits for a temperature-control medium.

German patent specification No. 867613 discloses a screw extrusion press having a housing in which bores which extend parallel to the axis of the screw are provided in the extruder cylinder, for the purposes of temperature control of the cylinder. This specification does not give any indication as to the manner in which uniform temperature control of the cylinder is to be achieved over the entire periphery by the peripherally disposed bores.

It is among the objects of the present invention, in a screw extrusion press having a cylinder in which peripheral bores are provided, to improve the uniformity of temperature distribution and to increase the heat exchange action between the medium and the extruder cylinder. A further object is to provide for the peripheral bores to be interconnected in such a way as to achieve uniform temperature distribution over the entire extruder cylinder. A still further object is to provide a manner of interconnecting the individual peripherally bored passages which is simple, operationally reliable and inexpensive.

According to the invention there is provided a screw extrusion press for processing thermoplastic plastics material or rubber, and having a cylinder which encloses a screw, the cylinder having in its wall bores to be connected to a supply conduit and a discharge conduit to permit passage through the bores of a temperature-control medium to control the temperature of the cylinder, the arrangement of bores comprising at least one set of three longitudinally extending bores which are disposed adjacent one another and are so series connected between an inlet and an outlet for the temperature-control medium, by annular passages by way of radially extending bores that the medium is caused to flow through a temperature-control passage which extends in a meander configuration.

Preferably one of the annular passages is provided at each end of the cylinder and further ones of the annular passages are provided in the form of annular manifold chambers in connecting flanges at the ends of the cylinder.

Advantageously respective sealing plug members are disposed in the annular passages to obstruct flow of the medium, after each third one of the longitudinally extending bores.

As the temperature-control medium is introduced into the meander-like passage system at one end of the cylinder, that is to say, the temperature-control medium in each case flows through at least three peripheral bores which are connected together in a meander configuration, and thereafter arrives at the outlet, the distance which must be covered by the temperature-control medium can be relatively short, thereby ensuring that a large amount of fluid can flow through the system and thereby providing for intensive temperature control without a high pressure loss in respect of the temperature-control medium.

A screw extrusion press according to the invention can have the advantages that:

the extruder cylinder can be heated up or cooled down quickly, when the extruder is brought into operation or when it is being changed over, the temperature-control action can respond more quicky to temperature control pulses, and differences in material stress within the extruder cylinder can be considerably reduced, thereby ensuring that the cylinder does not suffer distortion at one side, which distortion could result in contact between the screw and the cylinder.

The invention is diagrammatically illustrated by way of example in the accompanying drawings, in which.

Figure 1:
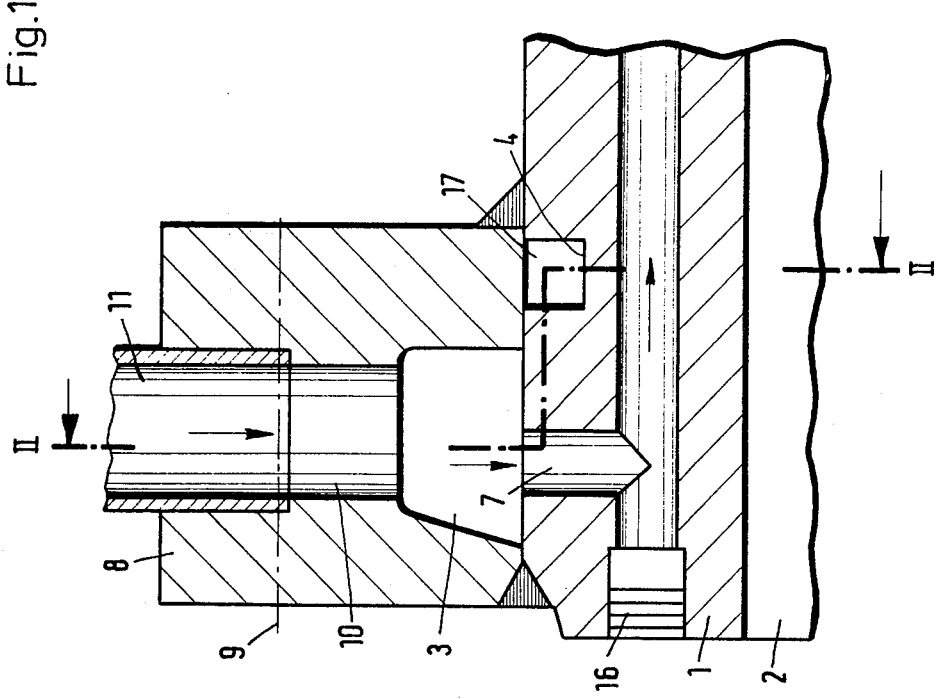
FIG. 1 shows a view in longitudinal section through part of a cylinder of a screw extrusion press according to the invention.

The addition of the letter "a" to an individual reference numeral denotes a respective similar component at the opposite end of the extruder cylinder.

The cylinder 1, 1a shown in FIG. 1 has a bore 2, 2a for receiving an extruder screw (not shown). A respective annular passage 4, 4a is provided at each end of the cylinder portion 1, 1a.

The cylinder has connecting flanges 8 and 8a at its ends in which connecting screw members, the positions of which are indicated at 9, 9a, can be engaged.

Provided in the connecting flanges 8 and 8a are annular manifold chambers 3, 3a. The connecting flange 8 has a bore 10 to which a supply conduit 11 (FIG. 3) for a temperature-control medium is connected at one end of the cylinder and a discharge conduit 12 for the temperature-control medium is connected to the flange 8a at the other end of the cylinder. Radial bores 7 connect the annular chambers 3, 3a to every third one of longitudinally extending bores 15 and the annular passages 4 and 4a are connected by radial bores 14 and 14a to the longitudinally extending bores 15, the ends of which longitudinally extending bores 15 are closed by plug members 16 and 16a.

Sealing plug members 17 are disposed at spaced positions in each of the annular passages 4 and 4a, after each third longitudinally extending bore 15.

Each set of three longitudinally extending bores 15 has a first end of a first one of the bores 15 connected by a respective one of the bores 7 to the manifold chamber 3. The second end of the first of the bores 15 is connected to a portion of the annular passage 4a by a respective one of the radial bores 14a. A second of the bores 15 of the set is connected to said portion of the annular passage 4a by a respective one of the bores 15 and at its other end is connected to a portion of the annular passage 4 by a respective one of the radial bores 14. A third one of the bores 15 of the set is connected to said portion of the annular passage 4 by a respective one of the radial bores 14 and at its other end is connected to the annular manifold chamber 3a by a respective one of the radial bores 7a.

Figure 3:
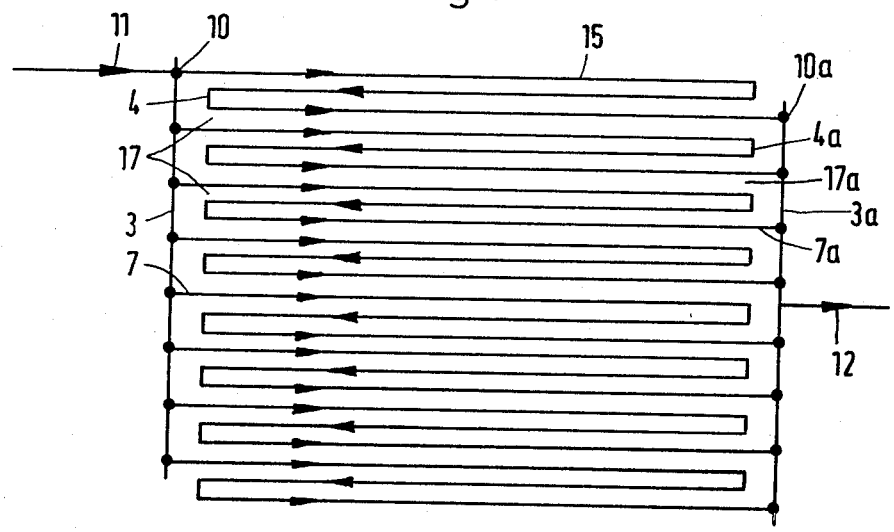
FIG. 3 shows the development of the temperature-control system in an extruder cylinder.

There is thus a meander-like through-flow of cooling medium, as diagrammatically shown in FIG. 3.

The mode of operation of the temperature-control system according to the invention is described hereinafter.

The temperature-control medium passes from the supply conduit 11 through the radial bores 7 into the first bore of each set of the longitudinally extending bores 15.

Thereafter, the medium flows to the other end of the cylinder and passes through the respective radial bores 14a into the respective portions of the annular passage 4a. From there, the medium flows in reverse direction through the respective radial bores 14a to be returned through an adjacent one of each of the sets of longitudinal bores 15 to the first end of the cylinder where it flows through the respective radial bores 14 into the respective portions of the annular passage 4.

As the annular chambers 4, 4a are closed off by respective sealing plug members 17, 17a after every third bore 15, the medium flows through the respective radial bores 14 into the third bores 15 of each set of three and towards the second end of the cylinder. After the temperature-control medium has flown through this meander-like bore system, it arrives by way of the respective bore 7a (FIG. 3) at the annular manifold chamber 3a and thus passes to the discharge conduit 12.

The temperature-control medium which passes into the bore system through the supply conduit 11 is distributed in the annular manifold chamber 3 and therefore flows through the three interconnected longitudinally extending bores 15 in each set, to the annular manifold chamber 3a, and from there to the discharge conduit 12.

Figure 2:
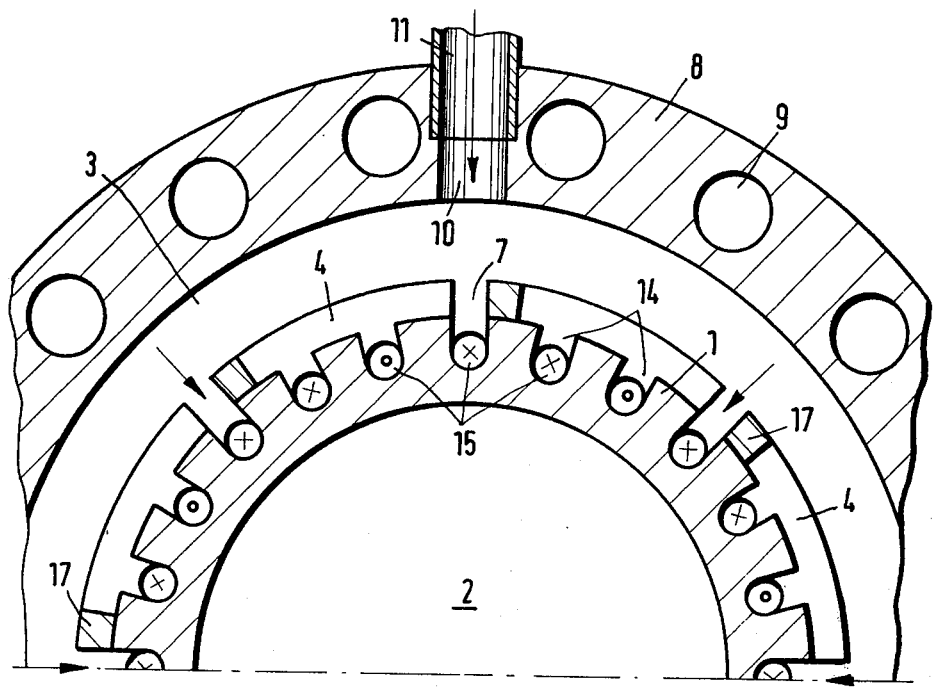
FIG. 2 shows a view in transverse section of part of the cylinder, taken on line II—II in FIG. 1.

In FIG. 2, crosses and points are shown in the longitudinally extending bores 15, a cross being intended to show supply flow of the temperature-control medium and a point showing the return flow. In FIG. 3, the supply and return flows of the medium are indicated by arrows shown on the diagrammatically illustrated bores 15.

Such a bore system can provide that the same temperature obtains at any point on the system between the passages, that is to say, there are uniform temperature conditions on the periphery of the cylinder. If furthermore more passages are combined to form a flow system and thus the number of parallel-connected flow systems is increased, the result of this is that the speed or turbulence of the temperature-control medium in the passages is increased, which resuls in a substantial improvement in the heat-exchange action.

Such a bore system can ensure an excellent and uniform temperature distribution over the entire periphery of the extruder cylinder and is very simple to produce.

The longitudinally extending bores 15 are formed in the wall of the extruder cylinder by a deep-hole boring machine. Then, the two annular passages 4 and 4a are each turned in the outer surface of the cylinder at respective ends of the cylinder.

The annular manifold chambers 3 and 3a are turned in the radially inner faces of the connecting flanges 8 and 8a. After the radial bores 10 and 10a have been formed in the connecting flanges 8 and 8a and the radial bores 7 and 7a and the radial bores 14 and 14a have been formed in the cylinder 1, the sealing plug members 17 and 17a are fitted into the annular passages 4 and 4a, after each third longitudinally extending bore 15, in such a way as to provide a respective passage of a meander-like configuration. The longitudinally extending bores 15 are closed at the ends by the plug members 16 and 16a and the connecting flanges 8 and 8a are engaged over the ends of the cylinder 1, 1a to cover the annular passages 4, 4a and are welded onto the end portions of the cylinder 1.

The cylinder 1 may comprise only a part of the length of the cylinder of the screw extrusion press i.e. it may be coupled end-to-end with other similar cylinders. 1.

What is claimed is:

1. A screw extrusion press for processing plastics materials and having a cylinder which encloses a screw, the wall of said cylinder being formed with a plurality of longitudinally extending bores which are arranged in sets of three, with the bores in each set being disposed adjacent one another and serially connected to pass through said bores of each set a temperature control medium; means for supplying said temperature control medium to said longitudinal bores and means for discharging said medium after passage through each set of bores, said supply means comprising an annular supply manifold, first radially extending bores communicating every third longitudinal bore with said annular supply manifold, and second radially extending bores serially connecting adjacent longitudinal bores of each set of bores through spaced annular passage means, whereby in each set of bores, said temperature control medium is caused to flow in a first direction through a first longitudinal bore, a second opposite direction through an adjacent second bore of said set, and then in said first direction through the third bore of said set, before discharge, the consequent meandering path of said medium providing for optimum temperature control.

2. A screw extrusion press as claimed in claim 1 wherein a respective one of said annular passages is provided at each end of said cylinder and further ones of said annular passages are provided in the form of annular manifold chambers in connecting flanges provided at the opposite ends of said cylinder.

3. A screw extrusion press as claimed in claim 2, wherein sealing plug members are disposed in said respective ones of said annular passages at the ends of the cylinder to obstruct flow of said medium, after each third one of said longitudinally extending bores.

* * * * *